Dec. 26, 1922.
S. G. RUSSELL.
FISHING REEL.
FILED SEPT. 27, 1921.
1,439,762
2 SHEETS, SHEET 1
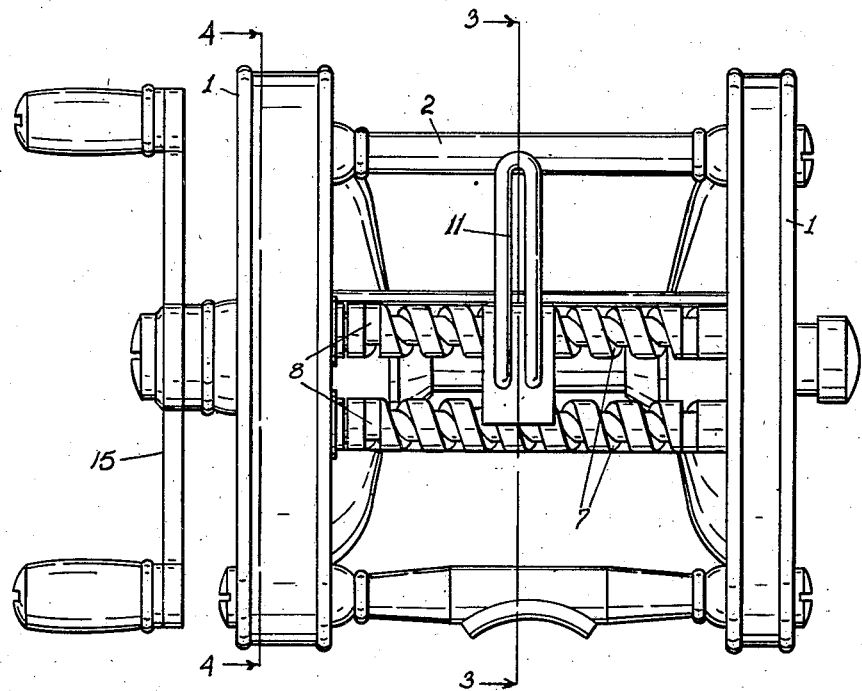
FIG. I.
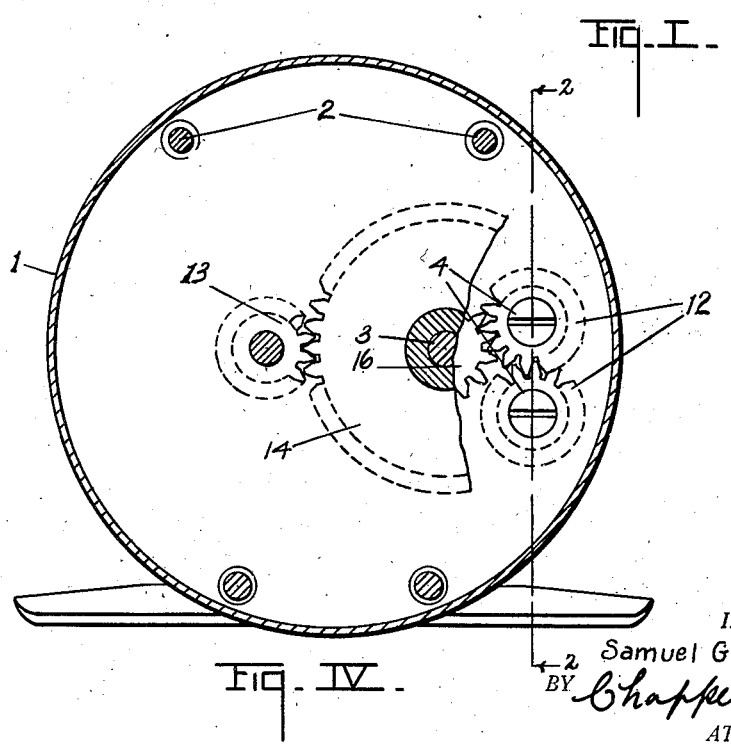
FIG. IV.
INVENTOR.
Samuel G. Russell
BY *Chappell & Earl*
ATTORNEYS.

Dec. 26, 1922.
S. G. RUSSELL.
FISHING REEL.
FILED SEPT. 27, 1921.
1,439,762
2 SHEETS SHEET 2
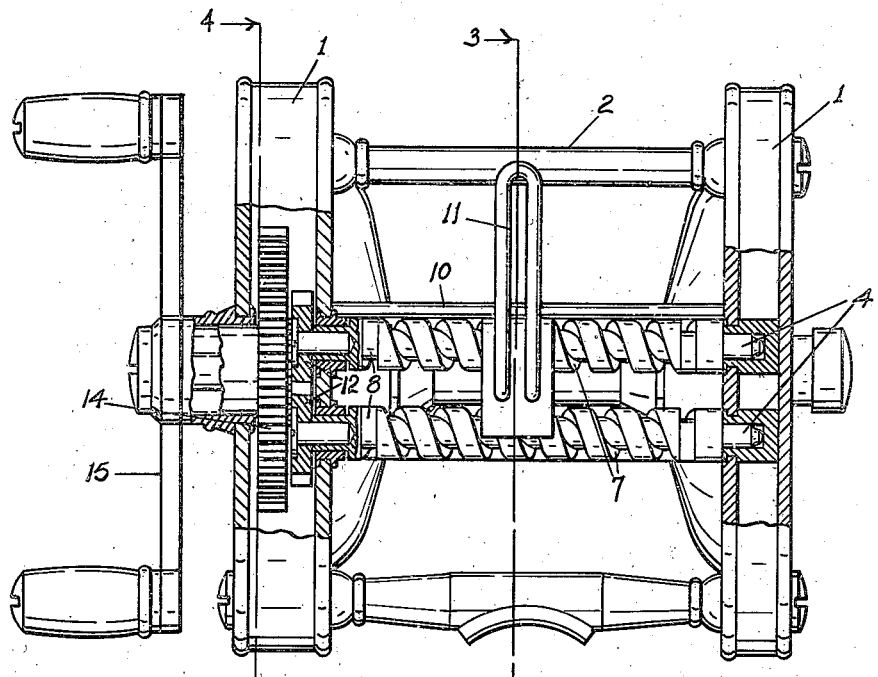
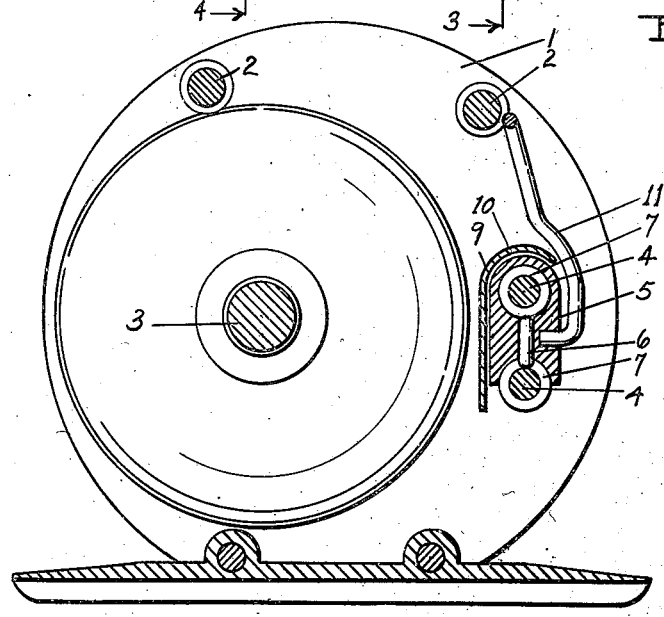
INVENTOR.
Samuel G. Russell
BY Chappell & Earl
ATTORNEYS.

Patented Dec. 26, 1922.

1,439,762

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed September 27, 1921. Serial No. 503,566.

*To all whom it may concern:*

Be it known that I, SAMUEL G. RUSSELL, a citizen of the United States, residing at the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the level wind type in which the single threaded traversing screws or shafts are employed.

Second, to provide an improved fishing reel having a pair of traversing screws or shafts which is compact and simple and durable in structure.

Third, to provide an improved level wind fishing reel in which the line guide carriage is mounted to move very freely and without binding.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side elevation looking from the front of my improved fishing reel.

Fig. II is a side elevation in vertical section on a line corresponding to line 2—2 of Fig. IV.

Fig. III is a transverse section on a line corresponding to line 3—3 of Figs. I and II.

Fig. IV is a detail view partially in transverse section on a line corresponding to line 4—4 of Figs. I and II.

In the drawings similar reference characters refer to similar parts throughout the several views, and the sectional views are taken looking in the direction of the little arrows at the ends of the section lines.

Referring to the drawings, the chambered heads or end members 1—1 are connected by pillars 2. The spool 3 is journaled in the heads and is preferably disposed eccentrically thereof as shown. At the front side of the spool are a pair of traversing screws or shafts 4, the shafts being disposed parallel and journaled in bearings carried by the heads. The line guide carriage 5 is slidably mounted on these shafts and provided with a pawl 6 coacting with both of the shafts; that is, the pawl is shifted from one shaft to the other at the ends of the carriage travel, the thread grooves 7 being provided with terminals 8 which shift the pawl. A housing 9 is provided for shafts and the carriage, the housing being disposed at the inner side of the shaft structure illustrated, and having an overhanging part 10. The line guide eye 11 is mounted on the carriage to project upwardly at the front of the housing.

Each traversing screw or shaft is provided with a pinion 12, the pinions being meshed as shown in Fig. IV, so that the shafts rotate in opposite directions. The spool is provided with a pinion 13. The driving gear 14 is connected to the crank 15, and is arranged in mesh with the pinion 13. A driving pinion 16 is disposed at the rear of the driving gear 14, and fixed to rotate therewith. The pinion 16 meshes with one of the traversing shaft pinions 12. The driving gear 14 overlaps both of the pinions 12. This secures a very compact arrangement of the gears within the frame and the traversing shafts are driven at a reduced speed relative to the spool.

With this arrangement of parts, the carriage travels very freely, there being no binding action and a cylindrical pawl may be used. The placing of one traversing screw above the other secures greater line capacity for a given diameter of head plates. Further, the single thread type of traversing shafts are easier to manufacture than the reversely threaded type of traversing shafts.

My improved fishing reel is simple and economical in its parts, is compact in structure, and is very durable.

Having thus described my invention, what I claim as new, and desire to secure by Letters Patent, is:

1. In a fishing reel, the combination of a frame comprising heads, a spool disposed eccentrically of said heads and provided with a pinion, a pair of traversing shafts disposed parallel one above the other at the front side of said spool and journaled in said heads, a line guide carriage slidably mounted on said traversing shafts and provided with a pawl coacting with said traversing shafts, a housing for said traversing shafts and carriage arranged at the inner side thereof and having a top portion overhanging the shafts and carriage, a line guide member on said carriage projecting upwardly at the front of the housing, a pair of meshing pinions on said traversing shafts, a driving gear meshing with the said spool pinion, and overlapping said driven pinions, and a driving pinion disposed at the inner side of said driving gear and meshing with one of the said traversing shaft pinions.

2. In a fishing reel, the combination of a frame comprising heads, a spool disposed eccentrically of said heads, a pair of traversing shafts disposed parallel at the front side of said spool and journaled in said heads, a line guide carriage slidably mounted on said traversing shafts and provided with a pawl coacting with said traversing shafts, a housing for said traversing shafts and carriage arranged at the inner side thereof and having a top portion overhanging the shafts and carriage, a line guide member on said carriage projecting upwardly at the front of the housing.

3. In a fishing reel, the combination of a frame comprising heads, a spool disposed eccentrically of said heads and provided with a pinion, a pair of traversing shafts disposed parallel at the front side of said spool and journaled in said heads, a line guide carriage slidably mounted on said traversing shafts and provided with a pawl coacting with said traversing shafts, a pair of meshing pinions on said traversing shafts, a driving gear meshing with the said spool pinion, and overlapping said driven pinions, and a driving pinion disposed at the inner side of said driving gear and meshing with one of said traversing shaft pinions.

4. In a fishing reel, the combination of a frame, a spool provided with a pinion, a pair of traversing shafts disposed parallel at the side of the said spool, a line guide carriage provided with a pawl coacting with said traversing shafts, a housing for said traversing shafts and carriage arranged to overhang the same, a line guide member on said carriage projecting upwardly at the side of the overhang of said carriage, a pair of meshing pinions on said traversing shafts, a driving gear meshing with the said spool pinion, and overlapping said driven pinions, and a driving pinion disposed at the inner side of said driving gear and meshing with one of said traversing shaft pinions.

5. In a fishing reel, the combination of a frame, a spool provided with a pinion, a pair of traversing shafts disposed parallel at the side of said spool, a line guide carriage provided with a pawl coacting with said traversing shafts, a housing for said traversing shafts and carriage arranged to overhang the same, a line guide member on said carriage projecting upwardly at the side of the overhang of said housing.

6. In a fishing reel, the combination of a frame, a spool provided with a pinion, a pair of traversing shafts disposed parallel at the side of the said spool, a line guide carriage provided with a pawl coacting with said traversing shafts, a pair of meshing pinions on said traversing shafts, a driving gear meshing with the said spool pinion, and overlapping said driven pinions, and a driving pinion disposed at the inner side of said driving gear and meshing with one of said traversing pinions.

In witness whereof, I have hereunto set my hand and seal in the presence of two witnesses.

SAMUEL G. RUSSELL. [L. S.]

Witnesses:
A. L. BURRELL,
W. E. CLARK.